United States Patent
Andarawis et al.

(10) Patent No.: US 7,558,701 B2
(45) Date of Patent: Jul. 7, 2009

(54) SYSTEM TO MONITOR THE HEALTH OF A STRUCTURE, SENSOR NODES, PROGRAM PRODUCT, AND RELATED METHODS

(75) Inventors: Emad Andarawis, Ballston Lake, NY (US); Ertugrul Berkcan, Clifton Park, NY (US); Eladio Delgado, Burnt Hills, NY (US); Robert Wojnarowski, Ballston Lake, NY (US); C. Scott Sealing, Clifton Park, NY (US); Nanette Gruber, Clifton Park, NY (US); Charles Seeley, Niskayuna, NY (US); Richard H. Coulter, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 640 days.

(21) Appl. No.: 11/286,795

(22) Filed: Nov. 23, 2005

(65) Prior Publication Data

US 2007/0118301 A1    May 24, 2007

(51) Int. Cl.
*G06F 19/00* (2006.01)
(52) U.S. Cl. .................... 702/183; 702/188
(58) Field of Classification Search ............ 702/34, 702/35, 183, 185, 188; 340/550, 870.01; 250/231.1, 358.1; 73/587, 768
See application file for complete search history.

(56) References Cited

U.S. PATENT DOCUMENTS

| | | | |
|---|---|---|---|
| 4,956,999 A | 9/1990 | Bohannan et al. | |
| 5,383,133 A | 1/1995 | Staple | |
| 5,440,300 A | 8/1995 | Spillman, Jr. | |
| 5,969,260 A | 10/1999 | Belk et al. | |
| 5,970,393 A | 10/1999 | Khorrami et al. | |
| 6,006,163 A | 12/1999 | Lichtenwalner et al. | |
| 6,399,939 B1 * | 6/2002 | Sundaresan et al. | 250/231.1 |
| 6,434,512 B1 | 8/2002 | Discenzo | |
| 7,276,703 B2 * | 10/2007 | Berkcan et al. | 250/358.1 |
| 7,343,265 B2 * | 3/2008 | Andarawis et al. | 702/188 |
| 2002/0050925 A1 | 5/2002 | Arms et al. | |
| 2003/0005486 A1 | 1/2003 | Ridolfo et al. | |
| 2003/0065428 A1 | 4/2003 | Mendelson et al. | |

(Continued)

FOREIGN PATENT DOCUMENTS

EP    1353252 B1    10/2003

OTHER PUBLICATIONS

Smart Sensors to Network the World, by David E. Culler and Hans Mulder—Scientific American, Jun. 30, 2004—pp. 53-59.

*Primary Examiner*—Bryan Bui
(74) *Attorney, Agent, or Firm*—Bracewell & Giuliani LLP

(57) ABSTRACT

A system to monitor the health of a structure, health monitoring sensor nodes, program product, and associated methods, are provided. The system includes an array of health monitoring sensor nodes connected to or embedded within a structure to monitor the health of the structure. Each health monitoring sensor node includes sensor elements positioned to sense parameters of the structure and to provide data related to the parameters to a health monitoring sensor node interrogator. Each health monitoring sensor node includes a processor or other means to reduce raw sensor data to thereby reduce communication bandwidth requirements and data collisions, and can include memory or other storage for storing the reduced data and an antenna arrangement for providing the reduced data to the health monitoring sensor node interrogator.

23 Claims, 8 Drawing Sheets

U.S. PATENT DOCUMENTS

2004/0039502 A1 2/2004 Wilson et al.
2004/0186636 A1 9/2004 Mendelson et al.
2007/0118335 A1 5/2007 Andarawis et al.

* cited by examiner

SYSTEM TO MONITOR THE HEALTH OF A STRUCTURE, SENSOR NODES, PROGRAM PRODUCT, AND RELATED METHODS

BACKGROUND OF THE INVENTION

1. Related Applications

This invention is related to Non-Provisional application Ser. No. 11/286,792, now U.S. Pat. No. 7,343,265, by Andarawis, et al., titled "System to Monitor the Health of a Structure, Sensor Nodes, Program Product, and Related Methods," filed on Nov. 23, 2005, and Non-Provisional application Ser. No. 11/287,009., now U.S. Pat. No. 7,276,703 by Berkcan, et al., titled "System to Monitor the Health of a Structure, Sensor Nodes, Program Product, and Related Methods," filed on Nov. 23, 2005, all incorporated by reference herein in their entirety.

2. Field of the Invention

The present invention relates generally to multi-node sensor systems. More specifically, the present invention relates to a system, sensor nodes, program product, and related methods to monitor the health of structural components and to reduce an amount of data required to be communicated.

3. Description of the Related Art

Various types of platforms such as, for example, aircraft structural components, aircraft skins, or other related components when in operation are subjected to various environmental conditions such as stress and strain, exposure to temperature extremes, and/or significant vibration energy. Due to the various environmental conditions such components can suffer material degradation over time.

Structural health monitoring helps promote realization of the full potential of such components. Remotely positioned sensors have been installed adjacent to such structures/components to monitor various parameters such as, for example, strain levels, stress, temperature, pressure, or vibration level to help manage physical inspection schedules, maintenance schedules, to help predict material failure, and generally monitor the "health" of such components. Such sensors have been provided a dedicated power supply such as power obtained through conductors, e.g., wires, connected to the aircraft electrical system or through chemical batteries. Such wiring can, in some instances, undesirably result in increased weight and complexity of the component being monitored and/or or the associated structure or component and are subject to damage or breakage requiring extensive repair costs and down time. Depending upon available space, batteries can be inappropriate due to their size. Batteries, which can also have a limited service life and, therefore, which typically require periodic inspection and/or replacement, are often positioned in locations difficult to reach, and often require costly disassembly and reassembly of the sensor or component to perform service on the battery. Further, batteries may not be suitable due to environmental constraints, i.e., temperature changes often affect battery performance.

Some more recent monitoring systems include fiber-optic sensors connected to a network of fiber-optic conductors to form an interrogation system. Such fiber-optic conductors, as with electrical conductors, can significantly raise the complexity of the component and/or deployment of the sensor system. Other monitoring systems include self-powered sensors attached to or embedded within the components to be monitored that can reduce dependence on batteries or any other external power source. Such sensors can be relatively small in size and can utilize, as a power source, energy obtained or otherwise transmitted through the component or structure being monitored.

Such devices can include those known as micro-electromechanical systems (MEMS). This type of sensor can typically consume very low amounts of power in the microwatt range. Other such devices can also include those known as piezoelectric devices. Some related piezoelectric devices can be in the form of actuators which can apply a force on the skin structure to dampen detected vibrations. Still other monitoring systems can include both active and passive wireless sensors attached to or embedded within the component or structure. The active wireless sensors can actively or passively collect and actively provide a continuous or intermittent stream of sampled raw data indicating parameters of the component or structure being monitored. The sensor data is typically collected by a central collector or by a series of intermediate collectors which provide such data to a central collector. The passive wireless sensors can also collect data with respect to parameters of the component or structure being monitored. The passive sensors, however, receive energy from, for example, a mobile vehicle or handheld base device or reader positioned adjacent each wireless sensor to provide power to extract the sensor data. The reader can transmit a signal to each wireless sensor to power the sensor and to transmit a request for data. In response to the signal from the reader, the wireless sensor can vary impedance of a wireless antenna, which the reader detects and uses to receive raw sensor data.

Such wireless devices attached to or embedded within the component or structure being monitored can have limitations on available power and communication bandwidth for reporting sensed data. Communicating raw sensor data places a significant burden on the communication system to accommodate the data transfer. Low sampling rate is typically employed to alleviate the data communication issues.

In view of the foregoing, it would be desirable to provide a sensor system that provides data reduction and/or compression schemes to reduce the amount of data that needs to be communicated and/or stored and to reduce power requirements in performing such communication and/or data storage. Further, it would be desirable to provide simple data reduction methods to reduce processing requirements in order to simplify the design of such sensors and to reduce such power requirements thereof.

SUMMARY OF THE INVENTION

In view of the foregoing, embodiments of the present invention advantageously provide a multi-node sensor system that utilizes data reduction techniques or schemes to determine important features of sensed parameters of a component or structure being monitored and that can transmit data describing such features rather than the sense parameters, themselves, thereby reducing communication bandwidth and/or power requirements. According to embodiments of the present invention, such data reduction can be accomplished by thresholding and/or trending of the raw sensor data. Features or parameters describing an exceeded threshold or a trend of the data can be extracted and communicated at a substantially lower communication bandwidth requirement than would be required to communicate the raw data. Additionally, such low complexity data reduction can allow for simpler more robust communication, reduced power requirements, and reduced memory requirements.

More specifically, in an embodiment of the present invention, a system to monitor the health of a structure that can reduce an amount of data required to be communicated, is provided. The system can include1 a structure such as, for example, an aircraft having a body or portion thereof, e.g., leading-edge, a joint, or the skin of an aircraft wing. The system can also include at least one but preferably a plurality of health monitoring sensor nodes each connected to or embedded within the body of the structure to monitor data related to parameters of a portion of the body of the structure. Each health monitoring sensor node can have a sensor element positioned to sense parameters of a respective portion of the body of the structure, a processor coupled to the sensor element to receive sensed parameters to define raw sensor data, and memory coupled to the processor to store operating instructions therein and to receive and store data. The system can also include one or more data collectors or interrogators having an antenna arrangement, e.g., antenna arrangement, either positioned or positionable to receive data from each of the plurality of health monitoring sensor nodes, and a central processor or computer to compile the collected data to provide for both monitoring and managing the health of the structure. The system can also include parameter processing program product separately stored in the memory of one or more of the plurality of health monitoring sensor nodes and including instructions that when executed by the respective processor performs the operations of reducing the raw sensor data, detecting an interrogation signal, and providing the reduced data to the interrogator.

Embodiments of the present invention and also include methods to monitor the health of a structure that can reduce an amount of data required to be communicated. For example, according to an embodiment of the present invention, a method can include the steps of positioning one or more health monitoring sensor nodes on or within a body of a structure to be monitored, sensing by the health monitoring sensor node parameters of the body of the structure to define sensed parameters, and processing the sensed parameters by the health monitoring sensor node to define raw sensor data. The method can also include reducing by the health monitoring sensor node the raw sensor data to define reduced data to thereby reduce data transmission bandwidth requirements. This data reduction can, for example, be accomplished through thresholding the raw sensed data, i.e., comparing the raw data to either a fixed or adaptive threshold value, or through forming a trend in either the raw data or threshold data values. The method can also include receiving by the health monitoring sensor node an interrogation signal from a data collector or interrogator, and providing to the data collector or interrogator the reduced data in response to receiving the interrogation signal.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Low power structural health monitoring applications rely on the ability to efficiently communicate sensed data. Such applications can have limitations on available power and communication bandwidth for reporting sensed data. Communicating raw sensor data places a significant burden on the communication system to accommodate the data transfer. Further, in applications having a large number of sensing nodes in close proximity to each other, communication between the sensor nodes and an interrogator or reader can be inefficient due to data collisions in the physical layer. Thus, advantageously, as illustrated in FIGS. 1-14, embodiments of the present invention provide a system, sensor nodes, program product, and methods to monitor the health of a structure that provides data reduction schemes to reduce the amount of data that needs to be communicated and/or stored, to reduce power requirements in performing such communication and/or data storage, and to otherwise reduce data collisions during communication.

Figure 1:
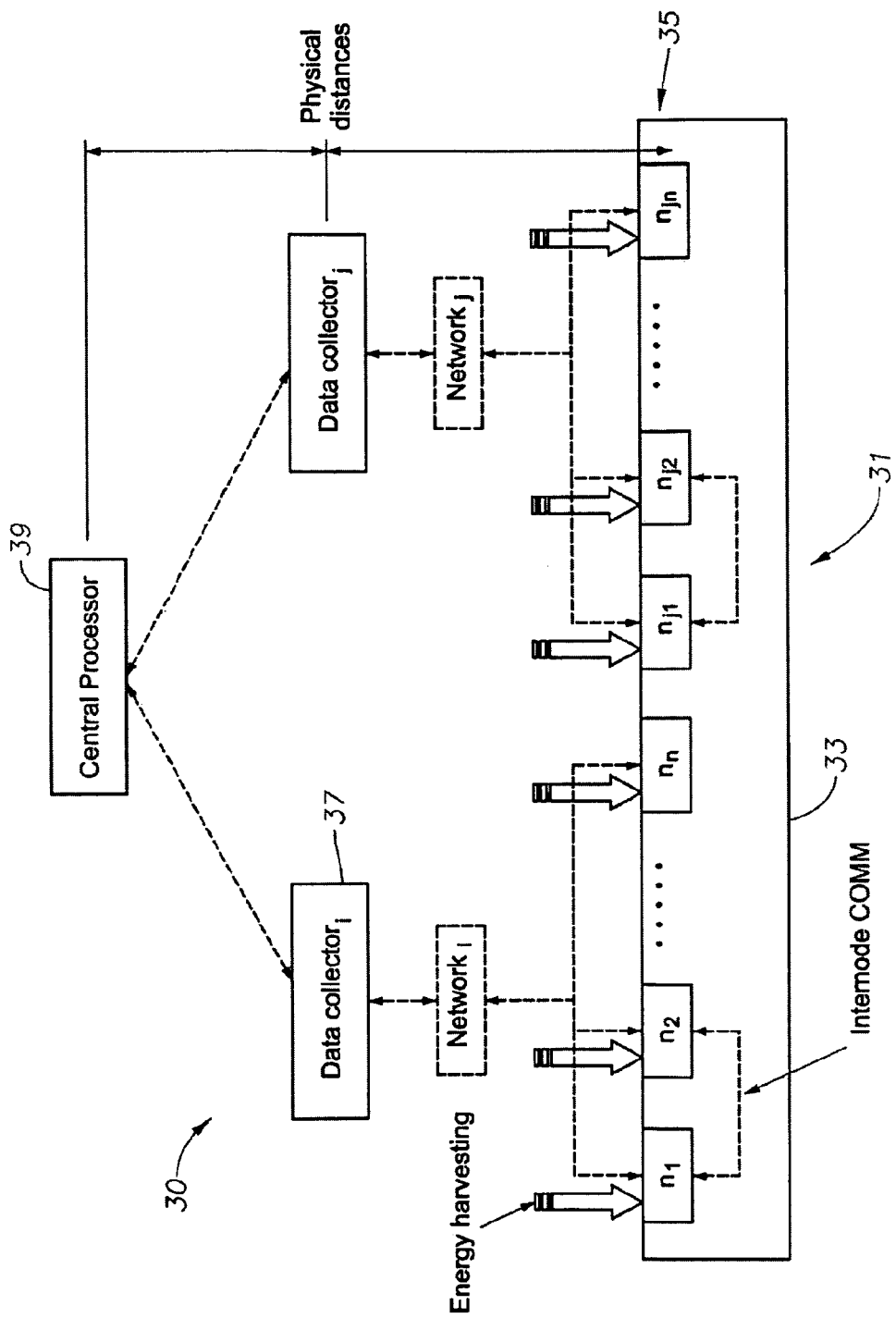
FIG. 1 is a schematic diagram of a general system architecture of a system to monitor the health of a structure according to an embodiment of the present invention.

According to an embodiment of the present invention, as perhaps best shown in FIG. 1, in general, a system 30 to monitor the health of a structure that provides data reduction schemes includes a structure 31 such as, for example, an aircraft having a body 33 or portion thereof, e.g., leading-edge, a joint, or the skin of an aircraft wing. The system 30 can also include a plurality of health monitoring sensor nodes 35 positionable to monitor the health of the structure, one or more data collectors or interrogators 37 either positioned or positionable to receive data from each of the health monitoring sensor nodes 35 or a selected or preselected portion thereof, and a central processor or computer 39 to compile the collected data to provide for both monitoring and managing the health of the structure 31.

Figure 2:
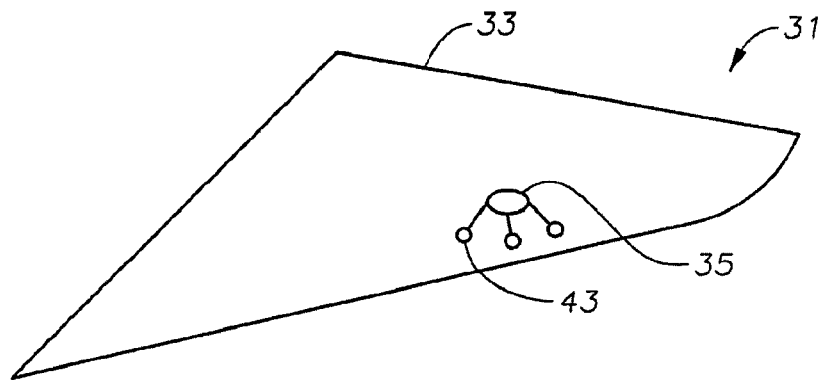
FIG. 2 is a partial environmental view of a system to monitor the health of a structure according to an embodiment of the present invention.

More specifically, as shown in FIG. 2, a system 30 includes a plurality of health monitoring sensor nodes 35, which can be connected to or embedded within, for example, the aircraft skin, to monitor data related to various parameters of interest. Such parameters of interest can include, for example, temperature, pressure, strain which is preferably temperature compensated, and acceleration including vibration levels, just to name a few. According to various embodiments of the present invention, as many as twenty to thirty or more health monitoring sensor nodes 35 per square foot can be positioned throughout strategic locations along the aircraft or other structure 31.

Figure 3:
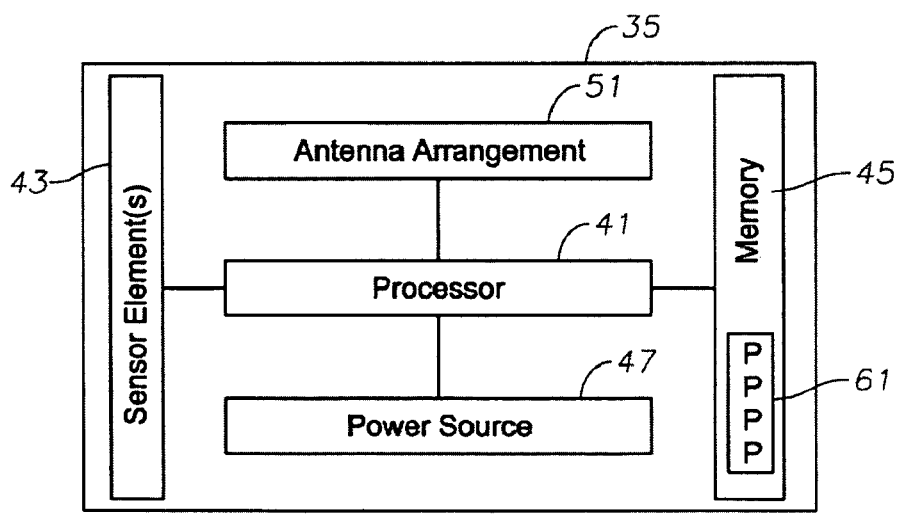
FIG. 3 is a schematic diagram of a health monitoring sensor node configured to communicate reduced raw sensor data according to an embodiment of the present invention.

As shown in FIG. 3, each health monitoring sensor node 35 can include a processor 41 in communication with one or more sensor elements 43, which can be operably connected to the processor 41 typically through either an electrical or a fiber-optic conductor and/or intermediate circuit elements known to those skilled in the art. The processor 41 can include various forms of a preferably integrated circuit known to those skilled in the art having arithmetic, logic, comparator, or control circuitry. Each sensor element 43 is adapted to sense the various parameters of interest (sensed parameters) such as, for example, strain, temperature, pressure, acceleration, sound, or other parameters known to those skilled in the art. Correspondingly, each sensor element 43 can be in the form of a strain gage, temperature sensor, pressure sensor, accelerometer, acoustic receiver, or other form of sensor known to those skilled in the art. Each health monitoring sensor node 35 can support one or more sensor elements 43 having either the same form or each having a separate form. For example, in order to provide temperature compensated strain, one sensor elements 43 can be a piezoelectric strain gage while the other can be a temperature sensor.

According to an embodiment of the present invention, each health monitoring sensor node 35 can also include memory 45 coupled to or otherwise in communication with the processor 41 to store operating instructions and to store data related to the parameters of interest. Such data can be in the form of either raw sensor data or a reduced form of the data such as, for example, a data structure or element summarizing the raw sensor data or summarizing information analyzed from the raw sensor data, described later. If the data (signal) from the sensor elements 43 is supplied in an analog form, a signal processor (not shown), e.g., analog-to-digital converter, located within or external to the main portion of the processor 41 can be used to digitize the sensor data for use by the processor 41. According to an alternative embodiment of the present invention, memory 45 can instead include a simple circuit capable of maintaining indicia of an occurrence of an event such as, for example, a single or multiple-channel event counter. Regardless, the memory 45 can be either incorporated within the processor 41 or be configured functionally separate from or external to the processor 41.

As shown in FIG. 3, each health monitoring sensor node 35 can a power source 47 adapted obtain or provide power necessary to perform the sensing function. Such power can be received, for example, directly from an adjacent aircraft or other structure 31 power grid (not shown), an internal or external chemical battery, a pre-charged power storage capacitor, or can be independently harvested according to various methodologies known to those skilled in the art and/or according to one or more of the methodologies as described in a U.S. Non-Provisional patent application Ser. No. 11/287,009, now U.S. Pat. No. 7,276,703 by Berkcan, et al., titled "System to Monitor the Health of Structural Components, Sensor Nodes, Program Product, and Related Methods" filed on Nov. 23, 2005, incoporated herein by reference in its entirety.

According to an embodiment of the present invention, for at least a subset of the health monitoring sensor nodes 35, the power source 47 can include an energy harvester adapted to perform such energy harvesting. Such energy can be provided by one or more of the following energy sources: mechanical energy including acoustic and vibration energy, thermal energy, solar or optical (light) energy, radiofrequency or other electromagnetic energy, chemical energy, or other. Correspondingly, the energy harvester can take various forms appropriate for the type of available energy. For example, the energy harvester can include a photovoltaic cell to harvest solar or optical energy, a receiver to harvest radiofrequency or other electromagnetic energy, or a thermoelectric generator to harvest thermal energy. Additionally, the power source 47 for each health monitoring sensor node 35 can also include a power storage circuit or device to store and to stabilize power received through harvesting during operation of the structure 31 being monitored or to store power received when in communication with data collector or interrogator 37. Note, using an energy harvester can have some advantages over using a chemical battery. For example, energy in an aircraft, e.g., mechanical and thermal, are significantly reduced when the aircraft is not flying. Such property can be used to limit data acquisition, and thus, limit data storage requirements to interesting time periods only, without a need to provide control signals to initiate or terminate parameter sensing.

Each health monitoring sensor node 35 can also include a radiofrequency antenna, transceiver, acoustic or optical transceiver, or other form of communication arrangement such as, for example, the illustrated antenna arrangement 51, operably coupled to the processor 41 to receive power and interrogation signals from a health monitoring sensor node data collector or interrogator 37 (see FIG. 1). For radio frequency communication schemes, the antenna arrangement 51 can be in the form of various circuit elements known to those skilled in the art such as, for example, a transceiver, LC tank circuit having a tunable or non-tunable resonant frequency, or other telemetry circuit positioned to receive power and/or interrogation signals from a data collector or interrogator 37 or other dependent or independent form of health monitoring sensor node readeror interrogator, capable of providing such reader or interrogator a detectable data signal. According to an embodiment of the present invention, the antenna arrangement 51 can take the. form of oneor mote of the various antenna arrangements described in a U.S. Non-Provisional patent application Ser. No. 11/286,792, now U.S. Pat. No. 7,343,365 by Andarawis, et al., also titled "System to Monitor the Health of Structural Components, Sensor Nodes, Program Product, and Related Methods," filed on Nov. 23, 2005, incorporated herein by reference in its entirety.

As shown in FIGS. 1 and 2, one or more data collectors or interrogators 37 can be provided to interrogate or otherwise receive data from each of one or more sets of health monitoring sensor nodes 35. According to various embodiments of the present invention, the data collectors or interrogators 37 can be handheld (not shown), fixed to the structure 31, e.g., aircraft or aircraft wing, at various strategic locations (see, e.g., FIG. 2), and/or be positioned within a fixed facility, e.g., hangar (not shown), to read the health monitoring sensor nodes 35 when the structure 31 is passed through a gate or when parked in a parking location. If the data collectors or interrogators 37 are on the structure 31, such devices can be used to instruct the health monitoring sensor nodes 35 when to begin collecting data and when to stop collecting data, thus, advantageously reducing storage requirements and/or power requirements for acquiring and storing data. According to a preferred embodiment of the present invention, the health monitoring sensor nodes 35 can utilize a passive communication scheme to communicate with the data collectors or interrogators 37, whereby the sensor nodes 35 obtain power from one or more of the health monitoring sensor node data collectors or interrogators 37, to provide or otherwise send the respective data message. As such, each health monitoring sensor node interrogator 37-health monitoring sensor node 35 combination can utilize various communication methodologies such as, for example, inductive coupling in the near field or backscatter coupling in the near or far field to provide for the passive communication data retrieval from the health monitoring sensor nodes 35.

According to various embodiments of the present invention, the health monitoring sensor nodes 35, as described above, can have limitations on available power and communication bandwidth for reporting the sensed data in its raw the form. Thus, the system 30 can utilizes data reduction techniques to determine and extract important features of sensed parameters of a component or structure being monitored and can transmit data describing such features rather than the sensed parameters, themselves, thereby reducing communication bandwidth requirements, and in some configurations, reducing data storage requirements. According to embodiments of the present invention, such data reduction can be accomplished by thresholding and/or trending of the raw sensor data, described below. That is, advantageously, features or parameters describing an exceeded threshold or a trend of the data can be extracted and communicated at a substantially lower communication bandwidth requirement than would be required to communicate the raw sensor data.

Figure 4:
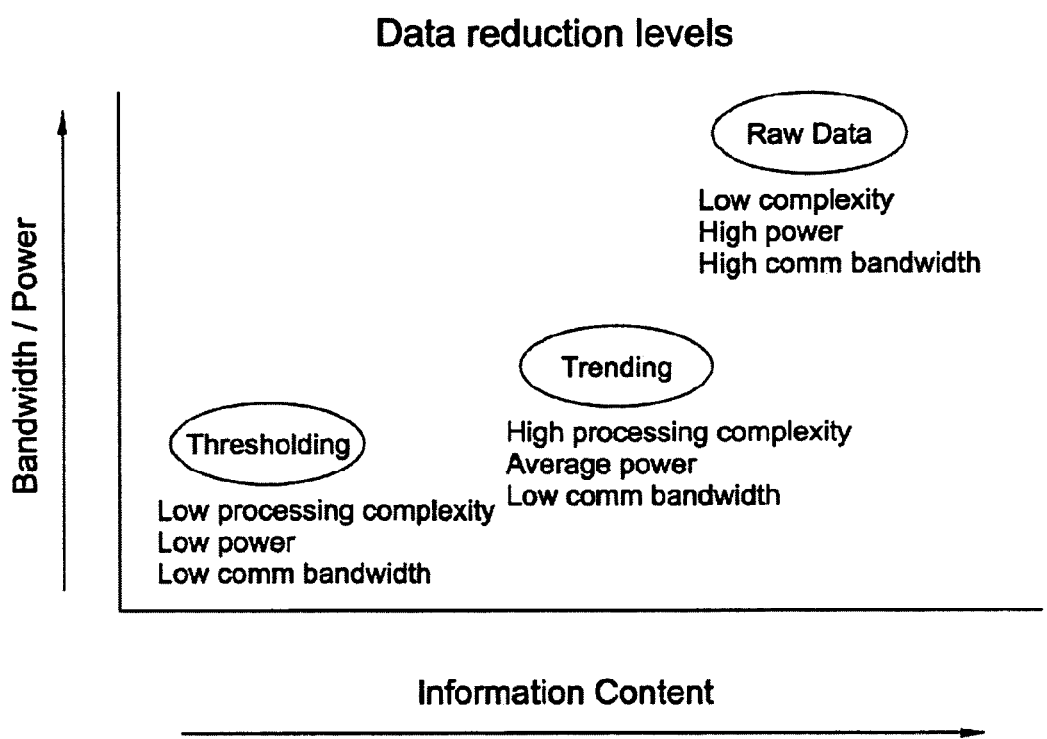
FIG. 4 is a schematic diagram of a graph indicating bandwidth and power requirements with respect to information content for various data reduction schemes according to an embodiment of the present invention.

As shown in FIG. 4, various forms of data can provide different levels of information content with respect to bandwidth or power requirements. Providing raw sensor data, data either received directly from the sensor elements 43 or through a signal processor, e.g., analog-to-digital converter (not shown), allows for a health monitoring sensor node having low complexity, but typically requires a relatively higher power level for storing and communicating the data, and a high communication bandwidth to communicate such data. Thresholding of the raw data can reduce power and bandwidth requirements, but typically at a cost of a somewhat significant reduction in the amount of information that can be provided. Trending of the raw sensor data, or a derivation thereof, can reduce power and bandwidth requirements while still providing relatively large information content.

Figure 5:
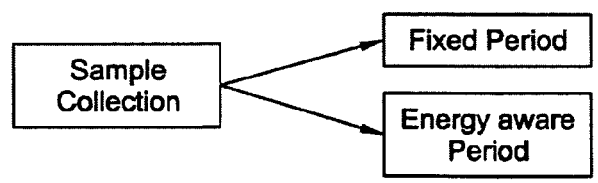
FIG. 5 is a schematic diagram illustrating various sample collection schemes according to embodiment of the present invention.

As shown in FIG. 5, the system 30 can incorporate threshold detection over a fixed period assuming a minimum amount of energy is available during such period, or during an energy aware period, i.e., continuous monitoring generally when "sufficient" energy is available. The health monitoring sensor node 35 can include a timekeeper as known to those skilled in the art, such as, for example, a counter or clock, which can provide a time or a reference which can be translated by the central processor or computer 39 into a relative time. The health monitoring sensor node 35 can also include a threshold detector, such as a comparator external to or functionally within a processor 41, to compare sensed data to the threshold value, and memory such as, for example, memory 45, which can be in the form of, for example, random access memory used by the processor 41 to store the timekeeping data and, in some embodiments, the associated threshold value, at the associated data point. The health monitoring sensor node 35 can also include a simple counter which can increment each time the threshold is crossed, a processor/program product driven counter, or a combination thereof, to record the number of times a threshold has been exceeded. Note, the counter for recording the number of threshold crossings can be a separate circuit, or incorporated within the processor 41 if the health monitoring sensor node 35 is so configured. For functional purposes, such counter can be considered to be part of memory 45. Note also, the term "exceeded" can be defined as crossing a selected or preselected maximum or minimum value.

Figure 6:
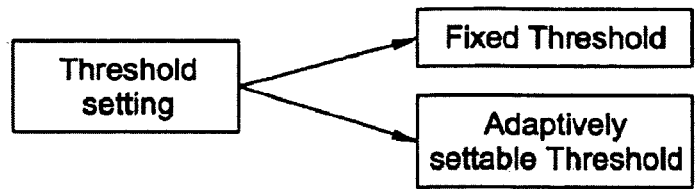
FIG. 6 is a schematic diagram illustrating various threshold settings according to an embodiment of the present invention.

As shown in FIG. 6, the system 30 can provide for a fixed threshold, an adaptively settable threshold, such as a threshold adapted for temperature and drift compensation, and a processor compensated threshold, whereby the threshold value is dynamically determined, i.e., an adaptive process. The fixed threshold embodiment is the simplest form generally requiring only accurate electronics that can be readily calibrated. An adaptively settable threshold generally requires one of the sensor elements 43 or an alternative sensor element (not shown) to sense a parameter, which provides the impetus to perform the adjustment to the threshold. Temperature, for example, can be used as an input to self-calibrate the threshold value. In the above two embodiments, sensor element output can be sampled either continuously or periodically to compare the output value to at least one selected or preselected threshold value, which in the latter configuration can be temperature compensated. If the predetermined threshold value is met or exceeded, collectively considered to be exceeded, an event is recorded. Depending upon the communication scheme, the health monitoring sensor node 35 can either provide data describing the event, real-time, or store the record of the event using either the simple counter or more complex random access memory for later communication. When stored for later communication, the health monitoring sensor node 35 can communicate such reduced data describing the number of events, i.e., the number of times the threshold was crossed.

The processor compensated threshold, though also configurable in hardware, is preferably implemented through use of a software or program product comparator, which can compare the sensed parameter value to a current threshold value. For example, assuming the structure 31 is an aircraft wing and the parameter of interest is strain, rather than record an entire time history of the strain experienced by the monitored portion of the wing, the number of times detected strain exceeds a selected or preselected value can be recorded. When exceeding an upper limit threshold value a selected or preselected number of times or number of times within a selected or preselected time period, the threshold value can be raised. If this value is also exceeded, such threshold value can again be raised. Note, according to embodiment of the present invention, raw sensor data can be taken, e.g., once each second or 50 times per second, and every thousand or so data points can be described by, e.g., two bites of data. Note also, according to embodiment of the present invention, the first threshold value can be used as a trigger or flag to initiate the data collecting function.

If the threshold value is not exceeded, or not exceeded for a selected or preselected number of times within a selected or preselected time period, the threshold value can be subsequently reduced. When exceeding a lower limit threshold value, according to a similar algorithm, the threshold value can be reduced. Advantageously, such adaptive threshold allows capture of more data than would be provided by merely counting a number of threshold crossings using a fixed threshold value. As such, rather than communicate raw data, the health monitoring sensor node 35 can reduce communication power requirements and time by communicating one or more of the following: the number of threshold crossings for each threshold value and/or the final threshold value, a final state of the captive threshold, or a time history of the captive threshold.

Figure 7:
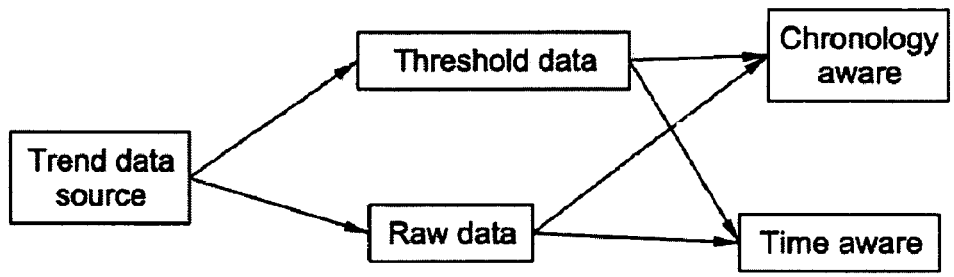
FIG. 7 is a schematic diagram illustrating various data trending sources according to embodiment of the present invention.
Figure 8:
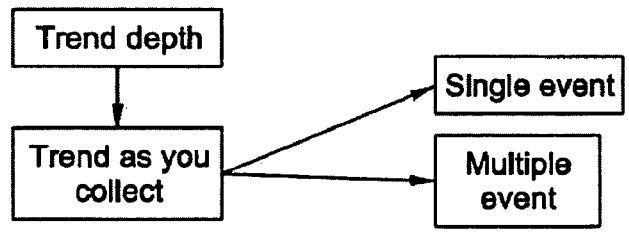
FIG. 8 is a schematic diagram illustrating various data trending types according to an embodiment of the present invention.
Figure 9:
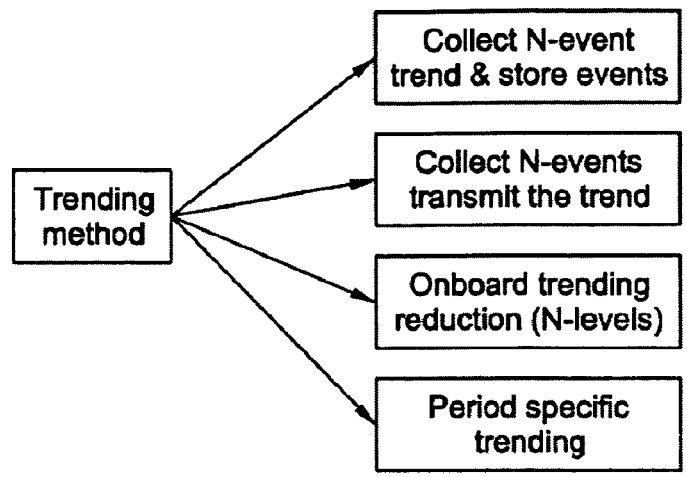
FIG. 9 is a schematic diagram indicating various data trending methodologies according to embodiment of the present invention.

As shown in FIG. 7, trending of data to thereby reduce data required to be communicated and/or stored can be provided either through trending raw sensor data or threshold data, described above. Further, such data can be provided in a format that is chronologically aware, i.e., trending is sensitive to the order of events, or time aware, i.e., trending is sensitive to when the events occur. With trending, data from the sensor element 43 is processed to determine a trend, and a description of the trend is communicated. As shown in FIG. 8, raw data can be trended as collected by reading the previously determined trend data, modifying the data to incorporate the sampled raw sensor data, and storing the current trend data. Multiple events can be trended accordingly. Alternatively, if memory is sufficient, sample points can be stored in memory and trended prior to communication with the data collector or interrogator 37. Note, if the memory storing the raw sensor data or trend data is full, the data in the buffer can be summarized or further summarized to allow additional data to be collected. Some of the available trending methodologies are shown in FIG. 9.

According to an embodiment of the present invention, the health monitoring sensor node 35 can receive from the data collector or interrogator 37 previous trend data stored by the central processor 39 to allow update using data outside either a fixed time period or an energy aware period. According to the preferred embodiment of the present convention, utilizing a metric such as, for example, a least squares method a descriptive curve can be fit or regressed to the trend. In such embodiment, only parameters describing the curve, e.g., coefficients of the curve equation, need to be communicated, thus, offering substantial information without adversely increasing the complexity, power, or communication bandwidth requirements. According to embodiments of the present invention, the current trend formulation for the raw data or threshold data (described later) can be accomplished using various metrics/statistical techniques such as, for example, regression (e.g., normal, Weibull or non-parametric curve fitting), extrapolation, and two sample T-tests.

Figure 10:
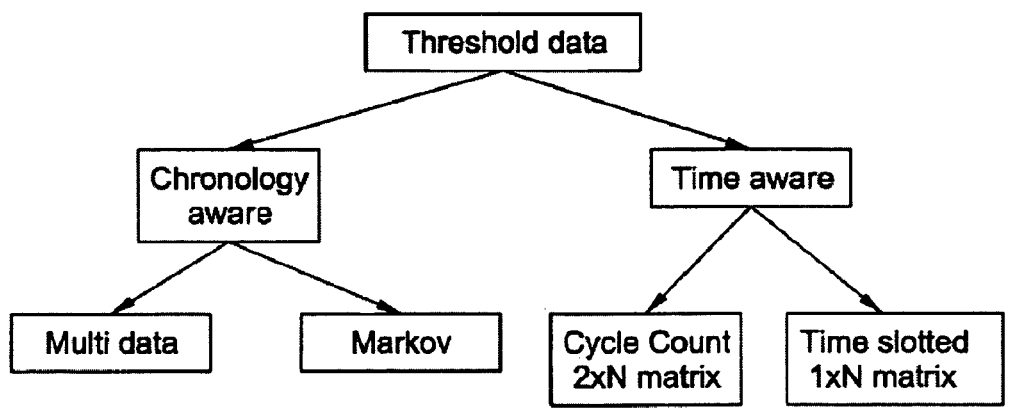
FIG. 10 is a schematic diagram indicating various data trending of threshold data methodologies according to an embodiment of the present invention.

As shown in FIG. 10, threshold data can be trended in either a chronologically aware or time aware form. In the chronologically aware form, the processor 41 can store, e.g., multiple sample sensor data and threshold state data in the memory 45 for the window of interest. Alternatively, in what is often referred to as a Markov process, the trend is developed from current, e.g., sample sensor data and a previous state of the threshold stored in the memory 45. In the time aware form, according to one embodiment of the present invention, memory 45 can be conceptually partitioned to store a 1-by-N table or matrix so that a series of, e.g., N sample sensor data values, are stored in an associated N time slots. Alternatively, memory 45 can be conceptually partitioned to store a 2-by-N table or matrix using a cycle count process. The table or matrix can hold a time related element such as, for example, an actual clock time, number of cycles, and/or number of samples within each cycle and a threshold value.

According to an embodiment of the present invention, either raw data or threshold data trends can be described by a finite number of modes known both to the health monitoring sensor nodes 35 and the data collector or interrogator 37/central processor 39. In this embodiment, the node 35 can determine the mode and provide to the data collector or interrogator 37 indicia of the determined mode. Advantageously, an indication of the current or recently observed mode selected from a choice of up to 256 modes can be provided by a single byte of data. For example, where mode #2 is defined as a linear increase in a predetermined vibration threshold according to a predetermined scheme, the node 35 need only transmit or otherwise provide indicia of mode. #2, e.g., 00000010. This data requirement can further be reduced where there are fewer possible modes.

According to embodiments of the present invention, as described above, although performing the function of reducing the data and providing the data to a data collector or interrogator, e.g., data collector or interrogator 37, can be performed through use of an individually tailored circuit arrangement known to those skilled in the art, to reduce costs and increase simplicity, each health monitoring sensor node 35 can be implemented using a processor 41 having access to operating instructions and parameter processing program product 61 stored, for example, in memory 45, which includes instructions that when executed by the processor 41 perform such functions. Note, the program product 61 can be in the form of microcode, programs, routines, and symbolic languages that provide a specific set for sets of ordered operations that control the functioning of the hardware and direct its operation, as known and understood by those skilled in the art.

More specifically, according to an embodiment of the present invention, the parameter processing program product 61 can include, for example, those instructions to perform the operations of processing the sensed parameters of the structure 31, e.g., aircraft or aircraft wing, sensed by the sensor elements 43 (FIG. 2), and sampling and receiving such sensor element signal to thereby form the raw sensor data. If the processed sensor signal is an analog form, such operation can also include converting the data to digital form for use by the processor 41. Alternatively, a signal processor (not shown) can perform such function. The operations performed also include reducing the raw sensor data, such as, for example, as described above.

Specifically, if a thresholding scheme is used, the operations can include comparing the raw sensor data to a preselected threshold value to thereby determine if the preselected threshold value is exceeded defining a threshold crossing event, and recording each threshold crossing event responsive to determining that the threshold value is exceeded, i.e., above a maximum or below a minimum selected or preselected value. The number of threshold crossings can then be recorded or otherwise stored, and/or communicated, as will be described below. Such recording can include from basic functions such as, for example, incrementing an event counter, to more complicated functions such as, for example, storing the reduced data in a table or matrix, and still be within the scope of the present invention.

Further, according to embodiment of the present invention, the instructions can include those to perform the operation of adaptively resetting the threshold value in response to the event count exceeding one or more preselected values. For example, assuming the sensed parameters include strain on, e.g., an aircraft wing, if a certain voltage equating to a preselected level X of strain is exceeded for a preselected number of times, e.g., twenty or exceeded by a preselected amount, a new strain level Y can be set by the processor 41 as the threshold level for further comparison. This resetting of threshold can be iteratively performed. Further, if the new threshold is not exceeded or not exceeded for a selected or preselected number of times or at a preselected or selected rate, the threshold can be reset either back to the original setting or to an intermediate point therebetween. Further, as noted previously, such threshold value can be adaptively set to a lower value than the original selected or preselected value in response to the original value not being exceeded by a selected or preselected time, rate, or value.

If a trending scheme is used, the operations can also include gathering source data to be trended and fitting a curve or otherwise forming an equation describing the source data. The source of the trend data can include the raw sensor data, the raw sensor data and associated threshold state data, a current raw data reading plus a previous threshold state, a set of threshold state data along with a time history, or other trended sensor data. For example, according to the preferred embodiment of the present invention, if the source data is the number of threshold crossing events, the trend of the number of threshold crossing events over time can be formed, and a curve can be fitted to such trend. Also for example, if the source data is raw sensor data, the processor 41 can iteratively compare the raw sensor data to prior trend data describing a prior trend of the raw data to thereby determine a current trend in the raw data. The prior trend can be stored in the memory 45 or provided by a data collector or interrogator 37. A curve can then be fitted to the current trend in the raw sensor data to thereby describe the current trend. Note, whether using a threshold data scheme, trend data scheme, or combination thereof, both state and current data value can be actual or assigned a value closest to a predetermined data point when the data points are pre-established, i.e., when a look up a table is used. Note also, where the set of possible data points is relatively small, such table or predefined curves can be stored in the memory 45 to thereby reduce processing requirements.

Regardless of the scheme used, the parameter processing program product 61, directly or indirectly, can perform the operation of detecting or otherwise receiving an interrogation signal, and providing the reduced data to the interrogator. As noted above, the reduced data can preferably include one or more of the following: data indicating a number of threshold crossings, data indicating a number of threshold crossings for each respective threshold value, data indicating a final state of the adaptive threshold, and data indicating a time history of the adaptive threshold, thereby providing substantial information without adversely increasing complexity, power, or bandwidth requirements of each of the health monitoring sensor nodes 35. Note, advantageously, according to an embodiment of the present invention, the reduced data can be reduced to include only that providing a final state of the adaptive threshold under certain configurations such as where, for example, the central processor or computer 39 knows or is otherwise provided the algorithm used by the sensor nodes 35 in determining the threshold. For example, in a configuration where the algorithm adjusts the threshold to a higher level based on a specific percentage or known amount in response to a readily determinable or preselected finite requirements, the central processor or computer 39 "knows" how each respective node 35 reached the current value of the adaptive threshold. Note also, when using a threshold crossing scheme and when time history is used as a data source, the preferred configuration includes storing in a table or matrix indicia of a value of the threshold versus time.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and instructions related to the parameter processing program product 61 described above and much of the method steps described below.

Figure 11:
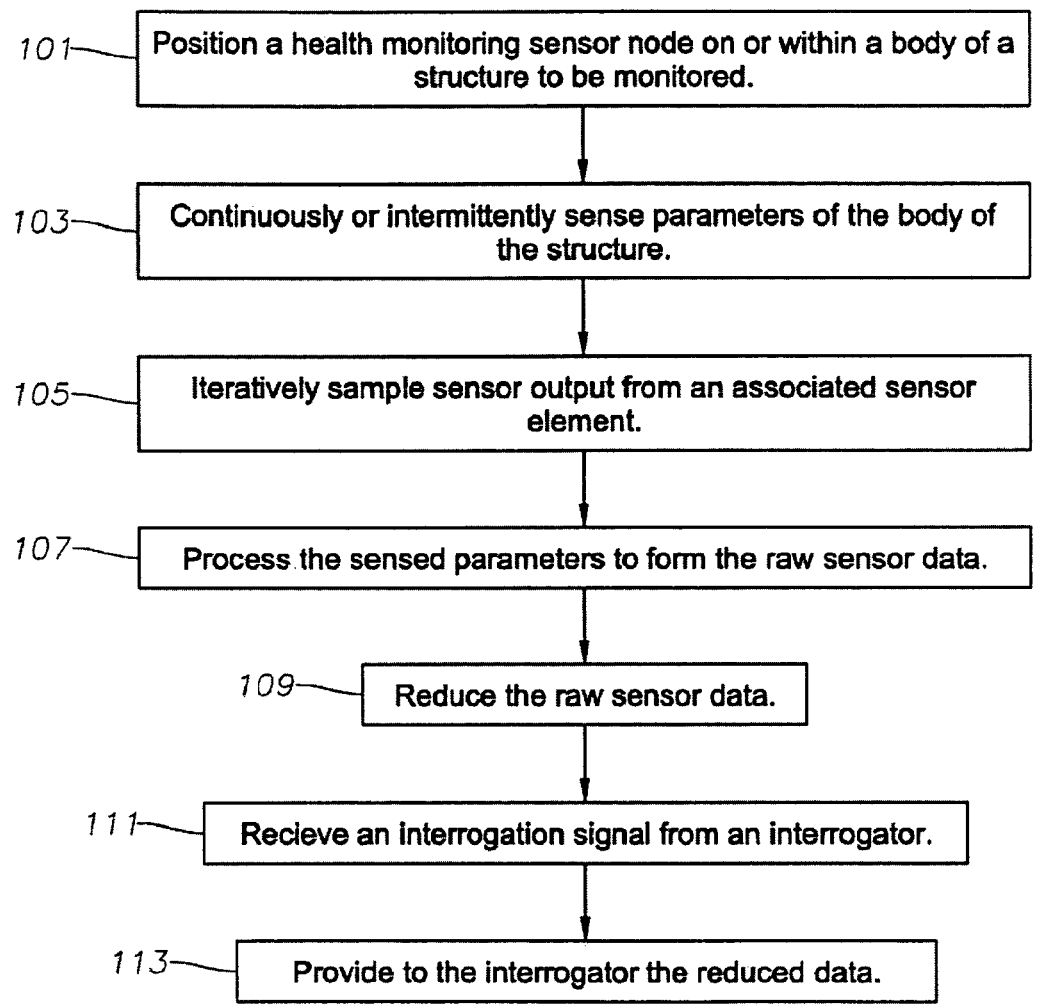
FIG. 11 is a schematic flow diagram of a method of monitoring structural health of a structure according to an embodiment of the present invention.

As shown in FIGS. 11-14, embodiments of the present invention include methods to monitor the structural health of a structure. For example, a high-level method is shown in FIG. 11. The method can include the step of positioning one or more health monitoring sensor nodes, such as, for example, health monitoring sensor nodes 35, on or within a body of a structure 31 to be monitored, e.g., an aircraft fuselage or wing (block 101). The method can also include the steps of continuously or intermittently sensing parameters of the body of the structure 31 by each health monitoring sensor node 35 to define sensed parameters (block 103), iteratively sampling sensor output from an associated sensor element or elements 43 (block 105), processing the sensed parameters (block 107) to thereby form the raw sensor data, and reducing the raw sensor data to a representative form (block 109) to reduce data transmission bandwidth requirements and/or storage requirements. Advantageously, this can be accomplished without the need to reduce sampling rates. Such reducing methodology preferably includes a threshold detection scheme, a trending scheme, or a combination thereof. The method can also include receiving by the health monitoring sensor node 35 an interrogation signal from a data receiver such as, for example, data collector or interrogator 37 (block 111), and providing the reduced data to the data collector or interrogator (block 113) in response to receiving the interrogation signal. Note, the interrogation signal may be as little as providing an electromagnetic signal which forms an inductive coupling between the data collector or interrogator 37 and health monitoring sensor node or nodes 35, or may include a data packet specifically addressed to each respective health monitoring sensor node 35.

Figure 12:
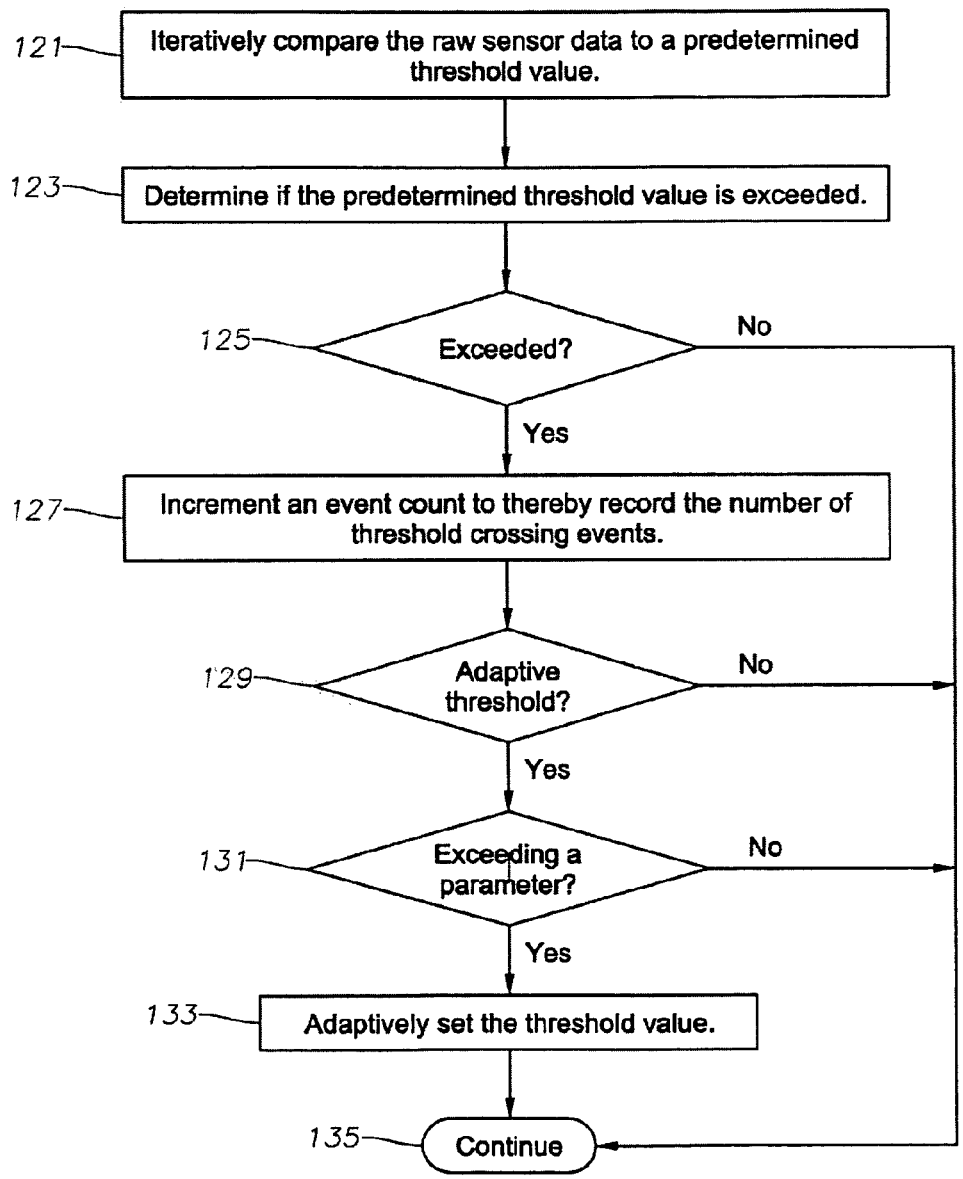
FIG. 12 is a schematic flow diagram of a method of monitoring structural health of a structure according to an embodiment of the present invention.

According to another embodiment of the present invention, as shown in FIG. 12, the step of reducing the raw sensor data according to a threshold detection scheme, can include the steps of iteratively comparing the raw sensor data to a selected or preselected threshold value (block 121), to thereby determine if the threshold value is exceeded (block 123). In response to determining the threshold value is exceeded (block 125), the processor 41 or a threshold detection circuit known to those skilled in the art can, for example, increment or cause to be incremented an event count (block 127) to thereby record the number of threshold crossing events. The event count can be a number stored in an event counter or numbers stored in a plurality of event counters or can be a number or numbers stored in random access memory accessible by the processor 41, if memory 45 is so configured. In such embodiment, the reduced data can include data indicating the number of threshold crossing events. Alternatively, the method can include recording a description of the raw sensor data responsive to determining that the threshold value is exceeded. In another embodiment of the present invention, the raw sensor data can be stored, the data collector or interrogators 37 can include with an interrogation signal the threshold value or a series of threshold values, and the above steps can be performed in response thereto.

In an embodiment of the present invention, the threshold can be an adaptive threshold (block 129). In such embodiment, similar to that described above, the processor 41 iteratively compares the raw sensor data to a threshold value to thereby determine if the threshold value is exceeded, and, if so exceeded, increments an event count. In such embodiment, however, the threshold value can be adaptively reset (block 133) in response to the respective event count being exceeded or other parameter being exceeded (block 131) such as, for example, value or rate of exceeding the threshold value. For example, in response to, e.g., one hundred threshold crossing events of a first threshold value, the processor 41 can reset the threshold value to a second threshold value. Further, in response to, e.g., fifty threshold crossing events of the second threshold value, the processor 41 can reset the threshold to a third threshold value. Note, the first threshold crossing, for example, can be used to signal the processor 41 to begin data collection and/or processing. Correspondingly, the threshold value can be adaptively reset in response to the respective event count not attaining a preselected or selected value or not attaining another parameter. For example, in response to, e.g., not reaching a first threshold value, the processor 41 can reset the threshold value to a second lower threshold value. Further, in response to, e.g., not reaching the second threshold value, the processor 41 can reset the threshold to a third lower threshold value. Accordingly, the reduced data can include one or more of the following: data indicating a number of threshold crossings, data indicating a number of threshold crossings for each respective threshold value, data indicating a final state of the adaptive threshold, and data indicating a time history of the adaptive threshold.

Figure 13:
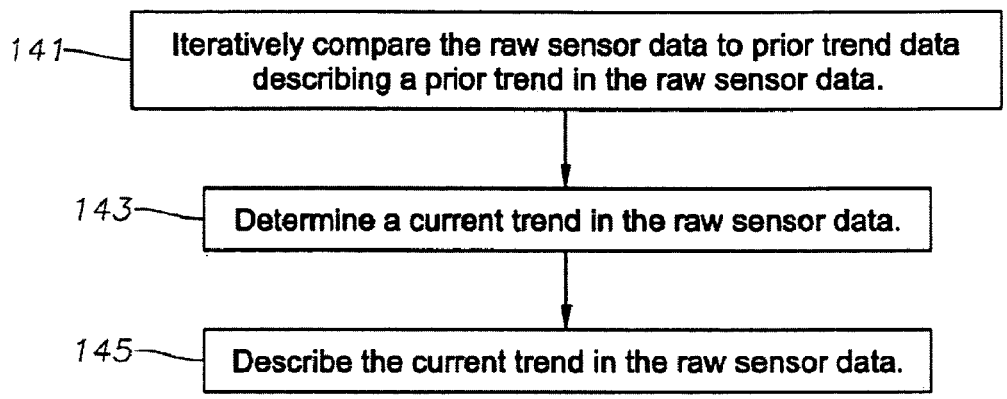
FIG. 13 is a schematic flow diagram of a method of monitoring structural health of a structure according to an embodiment of the present invention.

According to another embodiment of the present invention, as shown in FIG. 13, the step of reducing the raw sensor data according to a trending scheme, can include the step of iteratively comparing the raw sensor data to prior trend data describing a prior trend in the raw sensor data (block 141), to thereby determine a current trend in the raw sensor data (block 143). The prior trend data can be either stored in the memory 45 of the node 35 or transmitted from the data collector or interrogator 37 to the node 35. The method can also include the step of describing or otherwise providing a description of the current trend in the raw sensor data (block 145). For example, describing the current trend can include fitting by the health monitoring sensor node 35 a descriptive curve to the current trend in the raw sensor data, to thereby describe the current trend in the raw sensor data. In such configuration, the reduced data can include parameters describing the fitted curve. Where there is a fairly small possible number of modes of operation, a set of curbs describing the possible modes of operation can be stored in memory 45 of each node 35. In such embodiment, the step of providing the interrogator the reduced data can include providing a description of the current trend in the raw sensor data.

Figure 14:
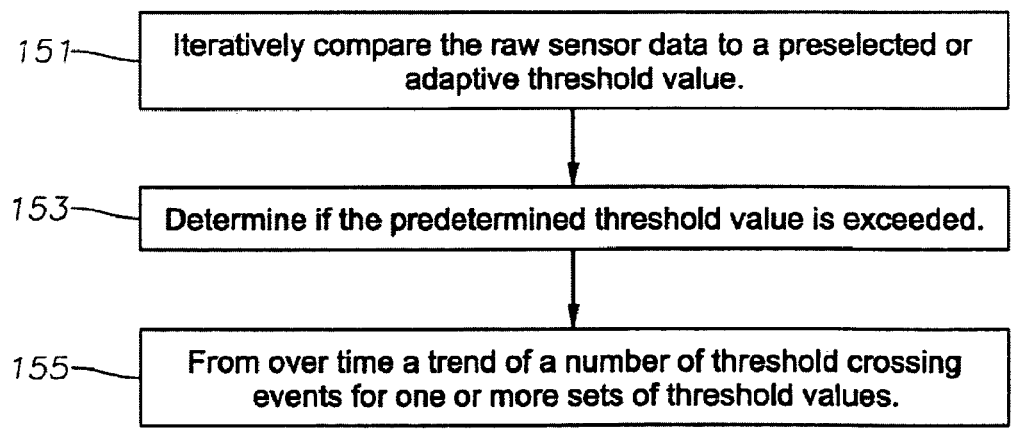
FIG. 14 is a schematic flow diagram of a method of monitoring structural health of a structure according to an embodiment of the present invention.

In another embodiment of the present invention, as shown in FIG. 14, the step of reducing the raw sensor data according to a trending scheme, can include the step of iteratively comparing the raw sensor data to a predetermined threshold value (block 151), to thereby determine if the predetermined threshold value is exceeded (block 153). The method can also include the step of forming over time a trend of a number of threshold crossing events for one or more sets of threshold crossing values (block 153). In such embodiment the reduced data can includes data indicating the trend of the number of threshold crossing events.

The invention has several advantages. Embodiments of the present invention provide health monitoring sensor nodes that employ data reduction to reduce the communication requirement for a sensor node in a structural health monitoring application. For example, according to embodiments of the present invention, nodes utilizing passive communications cannot be readily shut completely off. That is, when a reader or interrogator is on, each passive node is also on, reflecting or backscattering power. If operating on the same frequency, such nodes can limit the amount of data being transmitted to the reader or interrogator and can utilize pseudorandom tuning to avoid collisions to allow efficient transmission of sensed data. Also for example, nodes utilizing active communications may have a limited amount of stored power. Such nodes can utilize data reduction techniques to determine important features of a sensed parameter and limit transmission power requirements by transmitting data describing such features in such a reduced form. Both types of nodes can advantageously increase storage capacity by storing the sensed parameters in such a reduced form.

Advantageously, embodiments of the present invention include a system that uses thresholding as a method of data reduction. The system can sample a sensor element output and compare it against at least one pre-determined threshold value. If the sensor reading exceeds that threshold, an event is recorded. The communication is thus reduced to communicating data describing the number of times a certain threshold has been crossed. Advantageously, according to embodiments of the present invention, the threshold can be dynamically determined. An adaptive process can be performed in the sensor node, resulting in an adaptively changing threshold. A description of the state of the system is then communicated. The description can include a number of threshold crossings, a final state of an adaptive threshold, or the time history of the adaptive threshold. According to other embodiments of the present invention, the data from the sensor is processed to determine trends, and a description of the trends is communicated. Advantageously, the trending data source can include raw sensor data, the current state of the system in conjunction with a current sensor reading, a time history of sensor readings, and trended sensor data. For example, the number of threshold crossings over time and/or the raw sensor data can be trended. A descriptive curve can then be fit to the trend to describe the data, and parameters describing the trend curve can be communicated. Advantageously, the threshold data, trended data, or trended threshold data identified above can be further compressed using data compression methods shown to those skilled in the art to further reduce the data, and thus, avoid collisions.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, only a few of the identified methods of providing reduced data were described in detail, the other identified methods and others beyond those specifically mentioned but known to those skilled in the art are within the scope of the present invention.

This invention is related to Non-Provisional application Ser. No. 11/286,792, now U.S. Pat. No. 7,343,265, by Andarawis, et al., titled "System to Monitor the Health of a Structure, Sensor Nodes, Program Product, and Related Methods," filed on Nov. 23, 2005, and Non-Provisional application Ser. No. 11/287,009, now U.S. Pat. No. 7,276,703 by Berkcan, et al., titled "System to Monitor the Health of a Structure, Sensor Nodes, Program Product, and Related Methods," filed on Nov. 23, 2005; all incorporated by reference herein in their entirety.

That claimed is:

1. A multi-node sensor system to monitor the structural, health of a structure, the system comprising:
    a structure to be monitored having a body;
    a plurality of separate and spaced apart wireless health monitoring sensor nodes each connected to or embedded within the body of the structure to monitor data related to parameters of a portion of the body of the structure, each node having a sensor element positioned to sense parameters of a respective portion of the body of the structure to define sensed parameters, a processor coupled to the sensor element to receive sensed parameters to define raw sensor data, and memory coupled to the processor to store operating instructions therein;
    a data collector having a wireless receiver positioned to collect data individually from each separate one of the plurality of health monitoring sensor nodes over a wireless communication medium; and
    parameter processing program product separately stored in the memory of each of the plurality of health monitoring sensor nodes and including instructions that when executed by the respective processor performs the operations of:
        reducing the raw sensor data to define reduced data, and providing the reduced data to the data collector over the wireless communication medium, the reduced data comprising one or more of the following: one or more parameters describing one or more threshold crossing events, and one or more parameters describing a trend of the raw sensor data, and the reduced data providing a substantially reduced wireless transmission bandwidth requirement between the respective one of the plurality of health monitoring sensor nodes and the data collector over that required for providing the raw sensor data.

2. The system as defined in claim 1,
    wherein the parameter processing program product includes instructions to perform the operations of:
        sampling sensor output from the associated sensor element to thereby form the raw sensor data,
        comparing the raw sensor data to a preselected threshold value, to thereby determine if the preselected threshold value, is exceeded defining a threshold crossing event,
        recording each threshold crossing event responsive to determining that the threshold value is exceeded;
    wherein the reduced data includes data indicating a number of threshold crossing events; and
    wherein the operation of providing the reduced data to the data collector is responsive to detecting an interrogation sianal from the data collector.

3. The system as defined in claim 2,
    wherein event recording includes incrementing an event counter.

4. The system as defined in claim 1, wherein the parameter processing program product includes instructions to perform the operations of:
    sampling sensor output from the associated sensor element to thereby form the raw sensor data;
    comparing the raw sensor data to a threshold value, to thereby determine if the threshold value is exceeded;
    incrementing an event count responsive to determining that the threshold value is exceeded; and
    adaptively resetting the threshold value to define an adaptive threshold responsive to the event count exceeding the adaptive threshold value.

5. The system as defined in claim 4, wherein the reduced data includes at least one of the following:
    data indicating a number of threshold crossings;
    data indicating a number of threshold crossings for each respective threshold value;
    data indicating a final state of the adaptive threshold; and
    data indicating a time history of the adaptive threshold.

6. The system as defined in claim 4, wherein the threshold value is a first, threshold value, and wherein the instructions to perform the operation of adaptively resetting the threshold includes:
    resetting the first threshold value responsive to the event count exceeding a first preselected value to form a second threshold value; and
    resetting the second threshold value responsive to the event count exceeding the second threshold value to form a third threshold value.

7. The system as defined in claim 4,
    wherein the parameter processing program product includes instructions to perform the operation of forming a trend of a number of threshold crossing events over time; and
    wherein the reduced data includes data indicating the trend of the number of threshold crossing events.

8. The system as defined in claim 1,
    wherein the parameter processing program product includes instructions to perform the operations of:
        sampling sensor output from each of the plurality of sensor elements to thereby form the raw sensor data, and
        iteratively comparing the raw sensor data to prior trend data describing a prior trend in the raw sensor data, to thereby determine a current trend in the raw sensor data; and
    wherein the reduced data includes a description of the current trend in the raw sensor data.

9. The system as defined in claim, 1,
    wherein the parameter processing program product includes instructions to perform the operations of:
        sampling sensor output from the associated sensor element to thereby form the raw sensor data, for the respective node,
        iteratively comparirig the raw sensor data to prior trend data describing a prior trend in the raw sensor data, to thereby determine a current trend in the raw sensor data, and
        fitting a descriptive curve to the current trend in the raw sensor data to thereby describe the current trend in the raw sensor data; and
    wherein the reduced data includes parameters describing the fitted curve.

10. The system as defined in claim 9,
wherein the receiver of the data collector is a transceiver:
wherein the data collector is configured to request data from each of the plurality of health monitoring sensor nodes and to receive requested data therefrom; and
wherein the parameter processing program product includes instructions to perform the operation of receiving from the data collector the prior trend data describing at least a portion of the prior trend in the raw sensor data.

11. A method to monitor the structural health of a structure, the method comprising the steps of:
positioning a health monitoring sensor node, on or within a body of a structure to be monitored;
sensing parameters of the body of the structure by the health monitoring sensor node to define sensed parameters;
processing the sensed parameters by the health monitoring sensor node to define raw sensor data;
reducing the raw sensor data by the health monitoring sensor node to define reduced data to thereby substantially reduce wireless transmission bandwidth requirements between the health monitoring sensor node and a data collector over that required for providing the raw sensor data, the reduced data comprising one or more of the following: one or more parameters describing one or more threshold crossing events, and one or more parameters describing a trend of the raw sensor data; and
providing the reduced data to the data collector over the wireless communication medium.

12. The method as defined in claim 11,
wherein the method further includes the steps of:
iteratively sampling sensor output by the health monitoring sensor node from an associated sensor element to thereby form the raw sensor data,
iteratively comparing the raw sensor data by the health monitoring sensor node to a threshold value, to thereby determine if the threshold value is exceeded defining a threshold crossing event,
incrementing an event counter by the health monitoring sensor node responsive to determining that the threshold value is exceeded to thereby record the number of threshold crossing events; and
wherein the reduced data includes data indicating the number of threshold crossing events.

13. The method as defined in claim 11, wherein the method further comprises the steps of:
sampling sensor output by the health monitoring sensor node from an associated sensor element to thereby form the raw sensor data;
iteratively comparing the raw sensor data by the health monitoring sensor node to a threshold value, to thereby determine if the threshold value is exceeded;
incrementing an event count by the health monitoring sensor node responsive to determining that the threshold value is exceeded; and
adaptively resetting the threshold value by the health monitoring sensor node to define an adaptive threshold responsive to the respective event count exceeding the adaptive threshold value.

14. The method as defined in claim 13, wherein the reduced data includes at least one of the following:
data indicating a number of threshold crossings;
data indicating a number of threshold crossings for each respective threshold value;
data indicating a final state of the adaptive threshold; and
data indicating a time history of the adaptive threshold.

15. The method as defined in claim 13, wherein the threshold value is a first threshold value, and wherein the method includes adaptively resetting the threshold by the health monitoring sensor node which further includes the steps of:
resetting the first threshold value responsive to the event count exceeding a first preselected value to form a second threshold value; and
resetting the second threshold value, responsive to the event count exceeding the second threshold value to form a third threshold value.

16. The method as defined in claim 13, wherein the threshold value is a first threshold value, and wherein the method includes adaptively resetting the threshold value by the health monitoring sensor node which further includes the steps of:
resetting the first threshold value responsive to the raw sensor data not reaching the first threshold value for a first time period to form a second threshold value; and
resetting the second threshold value responsive to the raw sensor data not reaching the second threshold value for a second time period to form a third threshold value.

17. The method as defined in claim 13,
wherein the method further includes the step of forming over time a trend of a number of threshold crossing events by the health monitoring sensor node; and
wherein the reduced data includes data indicating the trend of the number of threshold crossing events.

18. The method as defined in claim 11,
wherein the method further comprises the steps of:
sampling sensor output by the health monitoring sensor node from an associated sensor element to thereby form the raw sensor data, and
comparing the raw sensor data to prior trend data in the raw sensor data by the health monitoring sensor node to thereby determine a current trend in the raw sensor data; and
wherein the reduced data includes a description of the current trend in the raw sensor data.

19. The method as defined in claim 11,
wherein the method further comprises the steps of:
sampling sensor output by the health monitoring sensor node from an associated sensor element to thereby form the raw sensor data,
comparing the raw sensor data to prior trend data describing a prior trend in the raw sensor data by the health monitoring sensor node, to thereby determine a current trend in the raw sensor data, and
fitting a descriptive curve to the current trend in the raw sensor data by the health monitoring sensor node to thereby describe the current trend in the raw sensor data; and wherein the reduced data includes parameters describing the fitted curve.

20. The method as defined in claim 11, wherein the method further comprises the step of:
sampling sensor output by the health monitoring sensor node from an associated sensor element to thereby form the raw sensor data;
comparing the raw sensor data to a threshold value, to thereby determine if the threshold value is exceeded; and
recording a description of the raw sensor data responsive to determining that the threshold value, is exceeded.

21. A method to monitor the structural health of a structure, the method comprising the steps of:
positioning a health monitoring sensor node, including a sensor element on or within a body of a structure to be monitored;

sampling sensor output by the health monitoring sensor node from the associated sensor element to thereby form raw sensor data;

comparing a value of the raw sensor data to a threshold value by the health monitoring sensor node, to thereby determine if the threshold value is exceeded;

incrementing an event count by the health monitoring sensor node responsive to determining that the threshold value is exceeded;

adaptively resetting by the health monitoring sensor node the threshold value to define an adaptive threshold responsive to the event count exceeding at least one predetermined value;

receiving by the health monitoring sensor node an interrogation signal from an interrogator over a wireless communication medium; and responsive to receiving the interrogation signal, the health monitoring sensor node providing to the interrogator one or more of the following forms of reduced raw sensor data over the wireless communication medium: data indicating a number of threshold crossings, data indicating a number of threshold crossings for each respective threshold value, data indicating a final state of the adaptive threshold, and data indicating a time history of the adaptive threshold, the reduced raw sensor data having a reduced transmission bandwidth requirement over that which would be required to provide the interrogator the raw sensor data.

22. A method to monitor the structural health of a structure, the method comprising the steps of:

positioning a wireless health monitoring sensor node on or within a body of a structure to be monitored, each node including a sensor element;

sampling sensor output by the wireless health monitoring sensor node from the associated sensor element to thereby form raw sensor data;

the health monitoring sensor node iteratively comparing the raw sensor data to prior trend data describing a prior trend in the raw sensor data, to thereby determine a current trend in the raw sensor data;

the health monitoring sensor node receiving an interrogation signal from an interrogator over a wireless communication medium; and responsive to the interrogation signal, the health monitoring sensor node providing to the interrogator over the wireless communication medium indicia of the current trend in the raw sensor data defining reduced data, the reduced data providing a reduced data transmission bandwidth requirement over that of a raw sensor data transmission bandwidth requirement to thereby provide reduced data collisions between the health monitoring sensor node and at least one other health monitoring sensor node.

23. The method as defined in claim 22, wherein the method further includes the step of fitting a descriptive curve to the current trend in the raw sensor data; and wherein the step of providing to the interrogator indicia of the current trend in the raw sensor data includes providing to the interrogator parameters describing the fitted curve.

* * * * *